United States Patent
Lee et al.

(10) Patent No.: US 10,724,619 B2
(45) Date of Patent: Jul. 28, 2020

(54) COMPOUND TRANSMISSION OF COMBINING DIFFERENTIAL GEAR AND CONTINUOUSLY VARIABLE TRANSMISSION

(71) Applicant: Korea Institute Of Geoscience And Mineral Resources, Daejeon (KR)

(72) Inventors: Chol Woo Lee, Daejeon (KR); Yong Chan Cho, Daejeon (KR); Chan Hee Park, Daejeon (KR)

(73) Assignee: KOREA INSTITUTE OF GEOSCIENCE AND MINERAL RESOURCES, Yuseong-gu (KR)

( * ) Notice: Subject to any disclaimer, the term of this patent is extended or adjusted under 35 U.S.C. 154(b) by 56 days.

(21) Appl. No.: 15/736,081

(22) PCT Filed: Sep. 11, 2015

(86) PCT No.: PCT/KR2015/009583
§ 371 (c)(1),
(2) Date: Dec. 13, 2017

(87) PCT Pub. No.: WO2016/208813
PCT Pub. Date: Dec. 29, 2016

(65) Prior Publication Data
US 2018/0180151 A1 Jun. 28, 2018

(30) Foreign Application Priority Data

Jun. 24, 2015 (KR) .................. 10-2015-0089644
Jun. 24, 2015 (KR) .................. 10-2015-0089651

(51) Int. Cl.
*F16H 37/10* (2006.01)
*F16H 3/089* (2006.01)
(Continued)

(52) U.S. Cl.
CPC ............ *F16H 37/10* (2013.01); *F16H 3/089* (2013.01); *F16H 9/18* (2013.01); *F16H 37/022* (2013.01);
(Continued)

(58) Field of Classification Search
CPC . F16H 37/10; F16H 3/089; F16H 9/18; F16H 48/08; F16H 37/022; F16H 57/021; F16H 57/035; F16H 57/037
See application file for complete search history.

(56) References Cited

U.S. PATENT DOCUMENTS 2,878,690 A * 3/1959 Uher .................. F16H 48/12
474/28
3,128,636 A * 4/1964 Graybill ............ F16H 61/66268
477/44
(Continued)

FOREIGN PATENT DOCUMENTS

JP 2015010645 A 1/2015
KR 19980047932 U 9/1998
(Continued)

OTHER PUBLICATIONS

International Search Report PCT/ISA/210 for International Application No. PCT/KR2015/009583 dated Feb. 19, 2016.

*Primary Examiner* — Tinh Dang
(74) *Attorney, Agent, or Firm* — Harness, Dickey & Pierce, P.L.C.

(57) ABSTRACT

The present invention relates to a transmission for a vehicle, and more particularly, to a compound transmission of combining a differential gear and a continuously variable transmission, which transmits power through the differential gear and a transmission gear at a low speed and transmits the power through the continuously variable transmission and the differential gear at a high speed.

(Continued)

According to the present invention, the shifting is performed through the differential gear unit at a low stage requiring large torque and low rpm and performs the shifting through the continuously variable transmission at a high stage requiring relatively small torque and high rpm to provide optimum shifting efficiency by collecting only advantageous of the respective units.

7 Claims, 8 Drawing Sheets

(51) Int. Cl.
    *F16H 48/08*     (2006.01)
    *F16H 37/02*     (2006.01)
    *F16H 57/021*     (2012.01)
    *F16H 57/035*     (2012.01)
    *F16H 57/037*     (2012.01)
    *F16H 9/18*     (2006.01)

(52) U.S. Cl.
    CPC ........... *F16H 48/08* (2013.01); *F16H 57/021* (2013.01); *F16H 57/035* (2013.01); *F16H 57/037* (2013.01)

(56) References Cited

U.S. PATENT DOCUMENTS

| | | | | | |
|---|---|---|---|---|---|
| 4,136,581 | A | * | 1/1979 | Winter | F16H 37/0846 474/32 |
| 4,329,888 | A | * | 5/1982 | Falzoni | F16H 37/022 475/204 |
| 4,392,394 | A | * | 7/1983 | Hofbauer | B60K 5/04 475/204 |
| 4,438,664 | A | * | 3/1984 | Fiala | F02N 11/0818 477/167 |
| 4,458,559 | A | * | 7/1984 | Croswhite | F16H 37/02 192/48.8 |
| 4,602,525 | A | * | 7/1986 | Moroto | F16H 3/62 475/205 |
| 4,627,308 | A | * | 12/1986 | Moroto | F16H 3/66 475/205 |
| 4,706,518 | A | * | 11/1987 | Moroto | F16H 3/66 475/205 |
| 5,234,073 | A | * | 8/1993 | Friedmann | B60K 5/02 180/292 |
| 5,853,343 | A | * | 12/1998 | Eggert | F16H 37/022 475/210 |
| 7,288,043 | B2 | * | 10/2007 | Shioiri | F16H 9/125 192/208 |

FOREIGN PATENT DOCUMENTS

| | | |
|---|---|---|
| KR | 1998060200 | 10/1998 |
| KR | 20110006194 A | 1/2011 |
| KR | 20120063339 A | 6/2012 |
| KR | 101459462 B1 | 11/2014 |

* cited by examiner

100(110,120)
500(510,520)
400(410,420,430)

300(310,320,330,340,350,360)

(I)

(II)

| - - → :POWER TRANSMISSION DIRECTION |
| ⟶ :ROTATIONAL DIRECTION |

- - → :POWER TRANSMISSION DIRECTION
——→ :ROTATIONAL DIRECTION

COMPOUND TRANSMISSION OF COMBINING DIFFERENTIAL GEAR AND CONTINUOUSLY VARIABLE TRANSMISSION

CROSS-REFERENCE TO RELATED APPLICATIONS

This application is a national phase under 35 U.S.C. § 371 of PCT International Application No. PCT/KR2015/009583 which has an International filing date of Sep. 11, 2015, which claims priority to Korean Patent Application No. 10-2015-0089644, filed Jun. 24, 2015 and Korean Patent Application No. 10-2015-0089651 the entire contents of each of which are hereby incorporated by reference.

TECHNICAL FIELD

The present invention relates to a transmission, and more particularly, to a compound transmission of combining a differential gear and a continuously variable transmission, which transmits power in a gear mode at a low speed and transmits the power through a continuously variable transmission at a high speed.

BACKGROUND ART

A transmission is a transmission device that changes power of an engine to required torque according to a speed and transmits the torque.

Vehicles or apparatuses such as excavators and mechanical pumps, which operate using the power generated by the engine, require stronger torque and lower rotation at lower speeds, and require high-speed rotation rather than the torque as a speed increases. The transmission plays such a role.

For example, a general automotive transmission includes shift stages from a first stage to a fifth stage. In first and second-stage gears, a reduction ratio is set to be large so as to exert strong force and in third and fourth-stage gears, a gear ratio is set to a gear ratio similar to the engine speed so as to maintain or accelerate the speed at a medium speed and the high speed. The fifth stage is referred to as an overdrive and has a gear ratio lower than the engine speed for driving at the high speed.

The transmission has a manual method in which a person manually operates a clutch and an automatic method in which a mission is directly shifted in accordance with the speed by hydraulic pressure according to whether the clutch is operated and includes a continuously variable transmission (CVT) which may obtain a continuously variable transmission ratio by using a belt instead of a gear.

In the past, the manual method was mainly used, but due to troublesomeness of an operation method, the automatic transmission or the continuously variable transmission has been mainly used in recent years.

Among them, the automatic transmission has a complicated structure and a high price, especially, the automatic transmission has a high fuel consumption rate compared to the manual method and since the gear ratio of the continuously variable transmission is continuously changed, it is possible to continuously use specific rpm to show the largest force, and as a result, fuel efficiency is improved, but there is a limit in transmitting large force, and as a result, in particular, there is a limitation that the automatic transmission is mainly used for a light-weight vehicle because there is a disadvantage that the power may not normally transmitted at the start or at the low speed and durability is weak.

Therefore, it is required to develop a new compound transmission that can get the advantages of each transmission out of a single-type transmission.

Meanwhile, the transmission is applied even to the excavator or a water pump to perform drilling or pumping of groundwater while rotating a shaft and even in this case, in order to change a pumping rate and change drilling performance, the rpm or torque of the shaft needs to be smoothly varied, a new compound transmission is required.

PRIOR ART DOCUMENT

Patent Document

Korean Patent Unexamined Publication No. 10-2012-0063339

DISCLOSURE

Technical Problem

In order to solve the conventional problems, an object of the present invention is to provide a compound transmission of combining a differential gear and a continuously variable transmission (CVT), which can provide smooth torque by performing shifting through the differential gear at a low speed while configuring a transmission by combing a transmission gear, the differential gear, and the continuously variable transmission (CVT) and provide smooth rpm by performing the shifting through the continuously variable transmission at a high speed.

Further, another object of the present invention is to provide a compound transmission of combining a differential gear and a continuously variable transmission (CVT), which is suitable for a large-sized vehicle which can achieve smooth shifting to the continuously variable transmission by switching a rotational direction of an auxiliary shaft to be the same as the rotational direction of the auxiliary shaft by the continuously variable transmission before the continuously variable transmission which operates at the high speed, and appropriately adjust a transmission ratio.

Technical Solution

In order to achieve the above object, a first exemplary embodiment of the present invention provides a compound transmission of combining a differential gear and a continuously variable transmission, which transmits power generated by an engine and shifts the power to rotational force required depending on a speed, including: a transmission housing; a main shaft connected to the engine while being embedded in the transmission housing and rotated by the power; an auxiliary shaft separated from the main shaft while being embedded in the transmission housing; an output shaft directly connected to the main shaft or connected to the main shaft via the auxiliary shaft and drawn from the transmission housing and outputting the rotational force; a transmission gear unit connecting the main shaft and the auxiliary shaft in a gear mode and connecting the main shaft and the auxiliary shaft in a set gear ratio and varying a rotational speed of the output shaft; a continuously variable transmission unit connecting the main shaft and the auxiliary shaft in a continuously variable transmission mode and varying the rotational speed of the output shaft; a differential gear unit connecting the main shaft and the auxiliary shaft with the output shaft in a differential gear mode and varying the rotational speed of the output shaft depending on the rotational speed of the auxiliary shaft while being rotated by the main shaft; a sleeve unit transmitting the rotational force of the main shaft to the differential gear unit through the transmission gear unit or transmitting the rotational force of the main shaft to the differential gear unit through the continuously variable transmission unit; and a fixed shaft unit restraining rotation of the auxiliary shaft through the sleeve unit to rotate the differential gear unit only through the rotational force of the main shaft or restraining rotation of a part of the differential gear unit to switch a rotational direction of the output shaft.

For example, the differential gear unit may be configured to include an output side gear fixed to the output shaft as a unity, rotating together with the output shaft, and configured by a conical bevel gear, an auxiliary side gear fixed to the auxiliary shaft as the unity and rotating together with the auxiliary shaft through the transmission gear unit or the continuously variable transmission unit and facing the output side gear in a symmetrical state, a pair of pinion gears rotating the output side gear while revolving around the output side gear and the auxiliary side gear in engagement with the output side gear and the auxiliary side gear and varying rpm of the output side gear while rotating by rotation of the auxiliary side gear by the rotation by the auxiliary shaft, a ring gear coupled to the auxiliary shaft to be idly rotatable while forming the same axis as the auxiliary shaft and rotated by the main shaft or locked to the auxiliary shaft by the sleeve unit and rotating together with the auxiliary shaft and connected with the pinion gears and revolving the pinion gears around the output side gear and the auxiliary side gear, a differential gear case fixed to the ring gear as the unity while being coupled to each of the pinion gears to be idly rotatable and rotating together with the ring gear, and a main shaft gear engaged with the ring gear while being coupled to the main shaft to be idly rotatable and locked to the main shaft by the sleeve unit to transmit the rotational force of the main shaft to the ring gear.

For example, the transmission gear unit may be configured to include a first gear fixed to the main shaft as the unity and rotating together with the main shaft, and a second gear engaged with the first gear while being coupled to the auxiliary shaft to be idly rotatable to idly rotate by the first gear or locked to the auxiliary shaft by the sleeve unit to rotate together with the auxiliary shaft and configured in a gear ratio to decrease rpm of the first gear to decrease the rpm of the auxiliary shaft and increase the rpm of the output side gear.

Here, the second gear is preferably formed to have a larger diameter than the ring gear.

For example, the sleeve unit may be configured to include a first sleeve installed in the main shaft and disposed adjacent to the main shaft gear and locking the main shaft gear to the main shaft, a second sleeve installed in the auxiliary shaft and disposed between the ring gear and the transmission gear unit and locking the ring gear to the auxiliary shaft or locking the transmission gear unit to the auxiliary shaft, and a third sleeve installed in the auxiliary shaft and disposed adjacent to the continuously variable transmission unit and transmitting the rotational force through the continuously variable transmission unit to the auxiliary shaft.

For example, the fixed shaft unit may be configured to include a first fixed shaft penetrated by the auxiliary shaft and fixed to the transmission housing and allowing rotation of the auxiliary shaft and locked to the auxiliary shaft by operating the sleeve unit and stopping the rotation of the auxiliary shaft, and a second fixed shaft adjacent to the main shaft gear and fixed to the transmission housing, locked to the main shaft gear in a close contact state and stopping the rotation of the main shaft gear and stopping the rotation of the ring gear.

For example, the continuously variable transmission unit may be configured to include a main sheave fixed to the main shaft as the unity and rotating together with the main shaft, and having an outer diameter which is varied, and an auxiliary sheave connected to the main sheave by a belt while being coupled to the auxiliary shaft to be idly rotatable and idly rotating by the rotation of the main sheave or locked to the auxiliary shaft by the sleeve unit and rotating the auxiliary shaft.

Meanwhile, a second exemplary embodiment of the present invention provides a compound transmission of combining a differential gear and a continuously variable transmission, which transmits power generated by an engine and shifts the power to rotational force required depending on a speed, including: a transmission housing; a main shaft connected to the engine while being embedded in the transmission housing and rotated by the power; an auxiliary shaft separated from the main shaft while being embedded in the transmission housing; an output shaft directly connected to the main shaft or connected to the main shaft via the auxiliary shaft and drawn from the transmission housing and outputting the rotational force; a transmission gear unit connecting the main shaft and the auxiliary shaft in a gear mode and connecting the main shaft and the auxiliary shaft in a set gear ratio and varying a rotational speed of the output shaft; a continuously variable transmission unit connecting the main shaft and the auxiliary shaft in a continuously variable transmission mode and varying the rotational speed of the output shaft; a differential gear unit connecting the main shaft and the auxiliary shaft with the output shaft in a differential gear mode and varying the rotational speed of the output shaft depending on the rotational speed of the auxiliary shaft while being rotated by the main shaft; a sleeve unit transmitting the rotational force of the main shaft to the differential gear unit through the transmission gear unit or transmitting the rotational force of the main shaft to the differential gear unit through the continuously variable transmission unit; a reverse gear set rotating the output shaft in a reverse direction through the rotation of the main shaft and the power transmission of the sleeve unit; and a rotary sink gear set operated by the sleeve unit and rotating the main shaft and the auxiliary shaft in the same direction.

For example, the rotary sink gear set is operated through the sleeve unit before the main shaft and the auxiliary shaft are connected by the continuously variable transmission unit to rotate the auxiliary shaft in the same direction as the continuously variable transmission unit.

For example, the differential gear unit may be configured to include an output side gear fixed to the output shaft as a unity, rotating together with the output shaft, and configured by a conical bevel gear, an auxiliary side gear fixed to the auxiliary shaft as the unity and rotating together with the auxiliary shaft through the transmission gear unit or the continuously variable transmission unit, the reverse gear set or the rotary sink gear and facing the output side gear in a symmetrical state, a pair of pinion gears rotating the output side gear while revolving around the output side gear and the auxiliary side gear in engagement with the output side gear and the auxiliary side gear and varying rpm of the output side gear while rotating by rotation of the auxiliary side gear by the rotation by the auxiliary shaft, a ring gear coupled to the auxiliary shaft to be idly rotatable while forming the same axis as the auxiliary shaft and rotated by the main shaft or locked to the auxiliary shaft by the sleeve unit and rotating together with the auxiliary shaft and connected with the pinion gears and revolving the pinion gears around the output side gear and the auxiliary side gear, a differential gear case fixed to the ring gear as the unity while being coupled to each of the pinion gears to be idly rotatable and rotating together with the ring gear, and a main shaft gear engaged with the ring gear while being coupled to the main shaft to be idly rotatable and locked to the main shaft by the sleeve unit to transmit the rotational force of the main shaft to the ring gear.

For example, the rotary sink gear set may be configured to include a main sink gear fixed to the main shaft as a unity and rotating together with the main shaft at all times, an auxiliary sink gear fixed to the auxiliary shaft to be idly rotatable and rotating by the main sink gear and locked to the auxiliary shaft by the sleeve unit and rotating together with the auxiliary shaft, and an idle gear engaged between the main sink gear and the auxiliary sink gear and rotating by the main sink gear and rotating the auxiliary sink gear in the same direction as the main sink gear.

For example, the reverse gear set may be configured to include a main reverse gear fixed to the main shaft as the unity and rotating together with the main shaft at all times, and an auxiliary reverse gear coupled to the auxiliary shaft to be idly rotatable and engaged with the main reverse gear and idly rotating by the main reverse gear or locked to the auxiliary shaft by the sleeve unit and rotating together with the auxiliary shaft and rotating the output side gear in a reverse direction through the auxiliary side gear and the pinion gear.

Here, the auxiliary reverse gear may be configured to have a smaller diameter than the main reverse gear to increase rpm of the auxiliary shaft and the auxiliary side gear and configured to have a smaller diameter than the ring gear configuring the differential gear unit to increase the rpm of the auxiliary shaft and the auxiliary side gear compared with the ring gear.

For example, the transmission gear unit may be configured to include a first gear fixed to the main shaft as the unity and rotating together with the main shaft at all times, and a second gear engaged with the first gear while being coupled to the auxiliary shaft to be idly rotatable to idly rotate by the first gear or locked to the auxiliary shaft by the sleeve unit to rotate together with the auxiliary shaft and configured in a gear ratio to decrease rpm of the first gear to decrease the rpm of the auxiliary shaft and increase the rpm of the output side gear.

For example, the sleeve unit may be configured to include a first sleeve installed in the auxiliary shaft and disposed between the ring gear and the transmission gear unit of the differential gear unit and locking the ring gear to the auxiliary shaft or locking the transmission gear unit to the auxiliary shaft, a second sleeve installed in the auxiliary shaft and disposed adjacent to the reverse gear set and locking the reverse gear set to the auxiliary shaft, and a third sleeve installed in the auxiliary shaft and disposed between the continuously variable transmission unit and the rotary sink gear and locking the auxiliary shaft to the continuously variable transmission unit or locking the rotary sink gear set to the auxiliary shaft.

Further, the sleeve unit may be configured to further include a fourth sleeve installed in the main shaft and installed adjacent to the main shaft gear of the differential gear unit and locking the main shaft gear to the main shaft and transmitting power of the main shaft to the ring gear or allowing idle rotation of the main shaft gear and interrupting the power of the main shaft.

For example, the continuously variable transmission unit may be configured to include a main sheave fixed to the main shaft as the unity and rotating together with the main shaft, and having an outer diameter which is varied, and an auxiliary sheave connected to the main sheave by a belt while being coupled to the auxiliary shaft to be idly rotatable and idly rotating by the rotation of the main sheave or locked to the auxiliary shaft by the sleeve unit and rotating the auxiliary shaft.

Effect

The compound transmission of combining the differential gear and the continuously variable transmission (CVT) according to the present invention described above performs the shifting through the transmission gear unit and the differential gear unit at a low stage requiring large torque and low rpm and performs the shifting through the continuously variable transmission unit and the differential gear unit at a high stage requiring relatively small torque and high rpm to provide optimum shifting efficiency by collecting only advantageous of the respective units.

In particular, in the present invention according to the first exemplary embodiment, the weight of the continuously variable transmission unit can be reduced because it is not necessary to perform the reverse shift and the down shift by the continuously variable transmission unit, and three-stage shifting and reverse shifting can be performed without a 3-stage gear set and a reverse gear set through a combination of the differential gear unit and the sleeve unit.

Further, in the present invention according to the first exemplary embodiment, since the auxiliary shaft rotates in the opposite direction to the main shaft at the lower stage and rotates in the same direction as the main shaft at the high stage to which the continuously variable transmission unit is applied, the continuously variable transmission unit is applied with low rpm when the shifting is first performed by the continuously variable transmission unit, thereby reducing friction loss.

In addition, in the present invention according to the second exemplary embodiment, before the operation of the continuously variable transmission unit operating at the high speed, the rotational direction of the auxiliary shaft is switched through a rotary sink gear set so that the rotational direction of the auxiliary shaft through the rotary sink gear is switched to be the same as the rotational direction of the auxiliary shaft by the continuously variable transmission unit, and as a result, more smooth shifting can be achieved in shifting to the continuously variable transmission at the high stage.

In addition, in the present invention according to the second exemplary embodiment, since the reverse gear set for reversing is installed, the reduction ratio according to the reverse shifting can be arbitrarily adjusted.

Further, in the present invention according to the second exemplary embodiment, since the auxiliary reverse gear is configured to have a smaller diameter than the ring gear of the differential gear unit, the output side gear can be reversely rotated while the auxiliary side gear rotates at higher rpm than the ring gear.

In addition, in the present invention according to the second exemplary embodiment, when the fourth sleeve is installed on the main shaft, the power is interrupted or transmitted between the main shaft and the output shaft, and as a result, when the gear is shifted while controlling the operation of the fourth sleeve, a clutch effect can be expected.

BEST MODE

Figure 1:
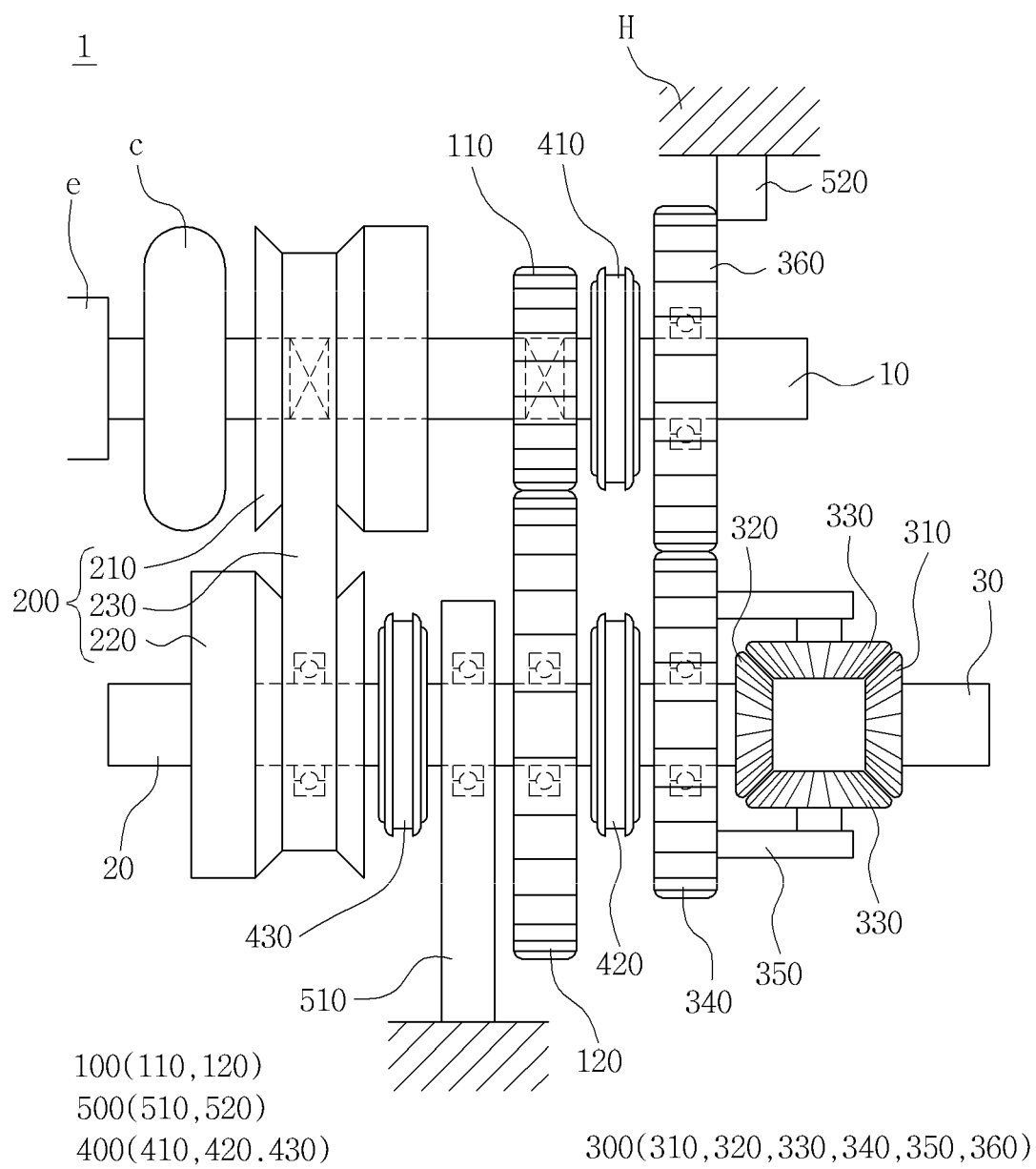
FIG. 1 is a configuration diagram illustrating a first exemplary embodiment of a compound transmission of combining a differential gear and a continuously variable transmission (CVT) according to the present invention.

Hereinafter, exemplary embodiments of the present invention will be described with reference to the accompanying drawings. In describing the present invention, detailed description of known related universal functions and configurations will be omitted.

An exemplary embodiment of a concept of the present invention may have various modifications and various forms and specific exemplary embodiments will be illustrated in the drawings and described in detail in the present specification or application. However, this does not limit the exemplary embodiment according to the concept of the present invention to specific exemplary embodiments, and it should be understood that the present invention covers all the modifications, equivalents and replacements included within the idea and technical scope of the present invention.

It should be understood that, when it is described that a component is "connected to" or "access" another component, the component may be directly connected to or access the other component or a third component may be present therebetween. In contrast, it should be understood that, when it is described that an element is "directly connected to" or "directly access" another element, it is understood that no element is present between the element and another element. Meanwhile, other expressions describing the relationship of the components, that is, expressions such as "between" and "directly between" or "adjacent to" and "directly adjacent to" should be similarly interpreted.

Terms used in the present specification are used only to describe specific exemplary embodiments, and are not intended to limit the present invention. A singular form may include a plural form if there is no clearly opposite meaning in the context. In the present specification, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

A compound transmission 1 in which a differential gear and a continuously variable transmission according to a first exemplary embodiment of the present invention may be configured to include a transmission housing H, a main shaft 10, an auxiliary shaft 20, an output shaft 30, a transmission gear unit 100, a continuously variable transmission unit 200, a differential gear unit 300, a sleeve unit 400, and a fixed shaft unit 500.

Here, the compound transmission of the present invention may be applied to a normal vehicle, and may also be applied to all devices that operate with power of an engine, such as excavators or underwater pumps, and which require a transmission.

The transmission housing H includes components of the present invention therein, and is installed adjacent to the engine e and a power performing member (not illustrated).

Here, the power performing member is a wheel that moves a vehicle body through rotational force when an application object is a vehicle, and a shaft that performs drilling or pumping when the application object is the excavator or the underwater pump.

The main shaft 10 is rotated by the power of the engine e and is connected to the engine e via a power transmitting member c such as a clutch or a torque converter as illustrated in FIG. 1 and is rotatably installed in the transmission housing H and is rotated by the power of the engine e.

As illustrated in FIG. 1, the auxiliary shaft 20 is rotatably installed in the transmission housing H while being separated from the main shaft 10 and is connected to the main shaft 10 and the output shaft 30 through the transmission gear unit 100, the continuously variable transmission unit 200, or the differential gear unit 300 to be described below.

The output shaft 30 is a member that is connected to the wheel (not illustrated) and rotates the aforementioned power-performing member while transmitting the power of the engine e.

The output shaft 30 is connected to the main shaft 10 and the auxiliary shaft 20 via the transmission gear unit 100, the continuously variable transmission unit 200 or the differential gear unit 300 described below and is directly connected to the main shaft 10 or connected to the main shaft 10 via the auxiliary shaft 20 depending on a driving speed to rotate the power-performing member in a forward or reverse direction.

The transmission gear unit 100 is a component that transmits the power of the main shaft 10 to the auxiliary shaft 20 by gear-connecting the main shaft 10 and the auxiliary shaft 20.

That is, the transmission gear unit 100 is a mechanical transmission member configured in a normal manual transmission.

The transmission gear unit 100 may be configured to include a first gear 110 and a second gear 120 as illustrated in FIG. 1.

The first gear 110 is fixed to the main shaft 10 as a unity as illustrated in FIG. 1 and rotates together with the main shaft 10 at all times.

The second gear 120 idly rotates while being engaged with the first gear 110 in a state where the second gear 120 is coupled to the auxiliary shaft 20 to be idly rotatable through a bearing or rotates together the auxiliary shaft 20 while being locked to the auxiliary shaft 20 by the second sleeve 420 described below.

Here, as illustrated in FIG. 1, the second gear 120 is configured to have a larger diameter than the ring gear 340 described below, so that the rpm of the auxiliary shaft 20 by the ring gear 340 is made to be lower than that of the auxiliary shaft 20 by the second gear 120.

This is to increase the rpm of the output side gear 310 described below by reducing the rpm of the auxiliary side gear 320 compared with the rpm of the ring gear 340 by the main shaft 10.

The continuously variable transmission unit 200 is a component that performs high speed shifting of the output shaft 30 while connecting the main shaft 10 and the auxiliary shaft 20 in a continuously variable transmission manner.

The continuously variable transmission unit 200 includes a main sheave 210, an auxiliary sheave 220, and a belt 230 like a conventional continuously variable transmission (CVT).

More specifically, the main sheave 210 rotates while being fixed to the main shaft 10 as the unity and an outer diameter of the main sheave 210 is varied. In addition, the outer diameter of the auxiliary sheave 220 is varied while the auxiliary sheave 220 is coupled to the auxiliary shaft 20 to be idly rotatable and the auxiliary sheave 220 idly rotates in connection with the main sheave 210 through the belt 230 or rotates the auxiliary shaft 20 while being locked to the auxiliary shaft 20 by a third sleeve 430 described below.

That is, as the outer diameter of the main sheave 210 increases, the rpm of the auxiliary sheave 220 increases to rotate the auxiliary shaft 20 at the high speed.

The differential gear unit 300 is a component that performs shifting while varying a transmission direction of the rotational force or the gear ratio while connecting the output shaft 30 to the main shaft 10 and the auxiliary shaft 20.

As is known, the differential gear is a device for appropriately dividing and driving the rpm of both wheels of the vehicle. A pair of pinion gears engaged with a pair of side gears connected to left and right wheels revolves around the side gear by the ring gear to rotate the side gear and as resistance is applied to any one wheel, the pinion gear rotates to increase the rpm of the other side gear.

For example, the differential gear unit 300 may be configured to include an output side gear 310, an auxiliary side gear 320, a pair of pinion gears 330, a ring gear 340, a differential gear case 350, and a main shaft gear 360.

Here, the output side gear 310, the auxiliary side gear 320, and a pair of pinion gears 330 are configured by bevel gears having the same shape and engaged in a symmetric state as illustrated in FIG. 1.

The output side gear 310 is fixed to the output shaft 30 as the unity and rotates together with the output shaft 30.

The auxiliary side gear 320 is fixed to the auxiliary shaft 20 as the unity and rotates together with the auxiliary shaft 20.

As illustrated in FIG. 1, a pair of pinion gears 330 are vertically engaged with the output side gear 310 and the auxiliary side gear 320 and rotates the output side gear 310 while revolving around the output side gear 310 and the auxiliary side gear 320 by the ring gear 340 described below and varies the rpm of the output side gear 310 while rotating by rotation of the auxiliary side gear 110 by the auxiliary shaft 20.

As illustrated in FIG. 1, the ring gear 340 is engaged with the main shaft gear 360 described below in a state where the ring gear 340 is rotatably coupled to the auxiliary shaft 20 through a bearing and the ring gear 340 idly rotates by the rotation of the main shaft gear 360 or is locked to the auxiliary shaft 20 by the second sleeve 420 described below to rotate together with the auxiliary shaft 20.

The ring gear 340 is connected with the pinion gears 330 through the differential gear case 350 described below to revolve the pinion gears 330 through rotation.

Here, as described above, the ring gear 340 is configured to have a smaller diameter than the second gear 120 and makes the rpm of the auxiliary shaft 20 by the ring gear 340 be higher than that of the auxiliary shaft 20 by the second gear 120.

As illustrated in FIG. 1, the differential gear case 350 is fixed to the ring gear 340 as the unity while forming a pair with the ring gear 340 and rotates together with the ring gear 340 and the pinion gears 330 are coupled to respective ends to be idly rotatable.

That is, the pinion gears 330 rotate together with the ring gear 340 by the differential gear case 350 to revolve around the output side gear 310 and the auxiliary side gear 320, and rotates by the rotation of the auxiliary side gear 110 by the auxiliary shaft 20 to vary the rpm of the output side gear 310.

As illustrated in FIG. 1, the main shaft gear 360 is engaged with the ring gear 340 while being coupled to the main shaft 10 to be idly rotatable through the bearing.

The main shaft gear 360 is locked to the main shaft 10 by a first sleeve 410 described below and rotates together with the main shaft 10 to transmit the rotational force of the main shaft 10 to the ring gear 340.

The sleeve unit 400 is a component that selectively transmits the rotational force to media connected when transmitting the rotational force of the main shaft 10 to the auxiliary shaft 20, that is the above mentioned main shaft gear 360, the ring gear 340, the second gear 120, an auxiliary sheave 220, and a first fixed shaft 510 described below.

As illustrated in FIG. 1, the sleeve unit 400 may be configured to include a first sleeve 410, a second sleeve 420, and a third sleeve 430.

The first sleeve 410 is installed on the main shaft 10 and moves along an axial direction under the control of a driver to lock the main shaft gear 360 to the main shaft 10.

The first sleeve 410 locks the main shaft gear 360 to the main shaft 10 and rotates the main shaft gear 360 and the main shaft 10 together in low-speed shifting such as the first-stage, the second-stage, and the third-stage and high-speed shifting such as the fourth-stage or higher and separates the main shaft gear 360 from the main shaft 10 to perform idle rotation.

As illustrated in FIG. 1, the second sleeve 420 is installed in the auxiliary shaft 20 and is disposed between the ring gear 340 and the second gear 120 so as to lock the ring gear 340 or the second gear 120 to the auxiliary shaft 20 under the control of the driver.

The second sleeve 420 locks the ring gear 340 to the auxiliary shaft 20 in the first-stage shifting and locks the second gear 120 to the auxiliary shaft 20 in the second-stage and reverse shifting, and does not operate in the third-stage shifting and the high-speed shifting such as the fourth-stage shifting or higher.

As illustrated in FIG. 1, the third sleeve 430 is installed on the auxiliary shaft 20 and is locked to the auxiliary sheave 220 of the continuously variable transmission unit 200 while moving along the axial direction under the control of the driver to transmit the rotational force of the main shaft 10 transmitted to the auxiliary sheave 220 to the auxiliary shaft 20 and stops rotation of the auxiliary shaft 20 while locking the auxiliary shaft 20 to a first fixed shaft 510 described below.

The fixed shaft unit 500 is a component that restrains the rotation of the auxiliary shaft 20 to rotate the differential gear unit 300 only through the rotational force of the main shaft 10 or restrains the rotation of the main shaft gear 360 described above and switches the rotational direction of the output shaft 30 to rotate the power performing member in a reverse direction.

The fixed shaft unit 500 may be configured to include the first fixed shaft 510 and a second fixed shaft 520 as illustrated in FIG. 1.

The first fixed shaft 510 is a component that stops the rotation of the auxiliary shaft 20 together with the third sleeve 430.

As illustrated in FIG. 1, the first fixed shaft 510 is fixed to the transmission housing H while being adjacent to the third sleeve 430 and locks the auxiliary shaft 20 through movement of the third sleeve 430 to stop the rotation of the auxiliary shaft 20.

That is, the third sleeve 430 locks the auxiliary sheave 220 to the auxiliary shaft 20 in the high-speed shifting of fourth-stage shifting or higher and locks the auxiliary shaft 20 to the first fixed shaft 510 in the third-stage shifting to stop the rotation of the auxiliary shaft 20 and the auxiliary side gear 320.

The second fixed shaft 520 is a component that stops the rotation of the main shaft gear 360 and is installed in the transmission housing H to lock the rotation of the main shaft gear 360 while operating under the control of the driver.

The second fixed shaft 520 locks the main shaft gear 360 in the reverse shifting to stop the rotation.

The operation for each stage of the compound transmission 1 according to the first exemplary embodiment of the present invention including the components will be described with reference to FIGS. 2 to 4.

Figure 2:
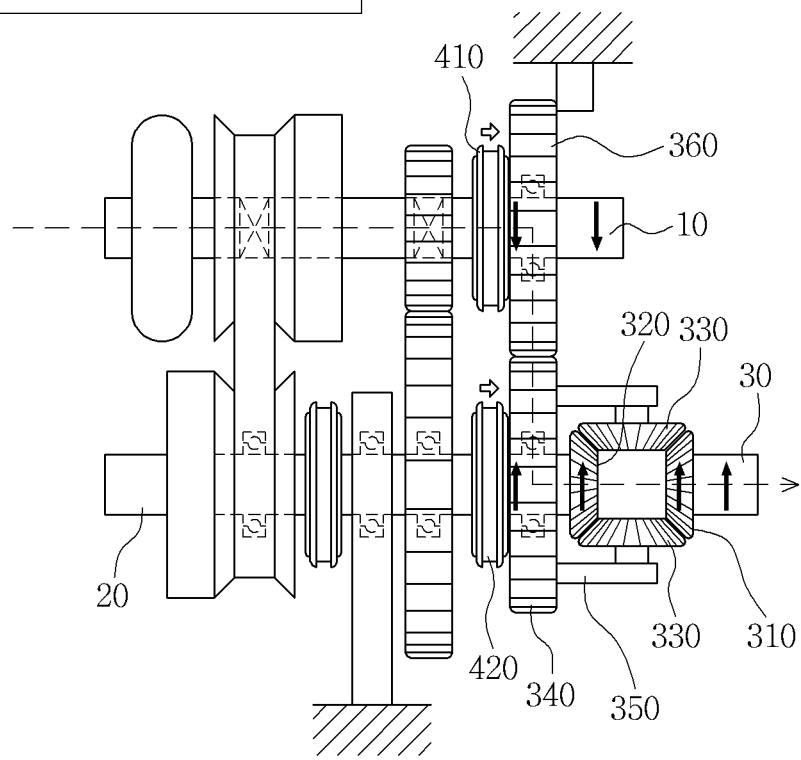
FIG. 2 is an operation state diagram illustrating first-stage shifting and second-stage shifting in the first exemplary embodiment according to the present invention.
Figure 2:
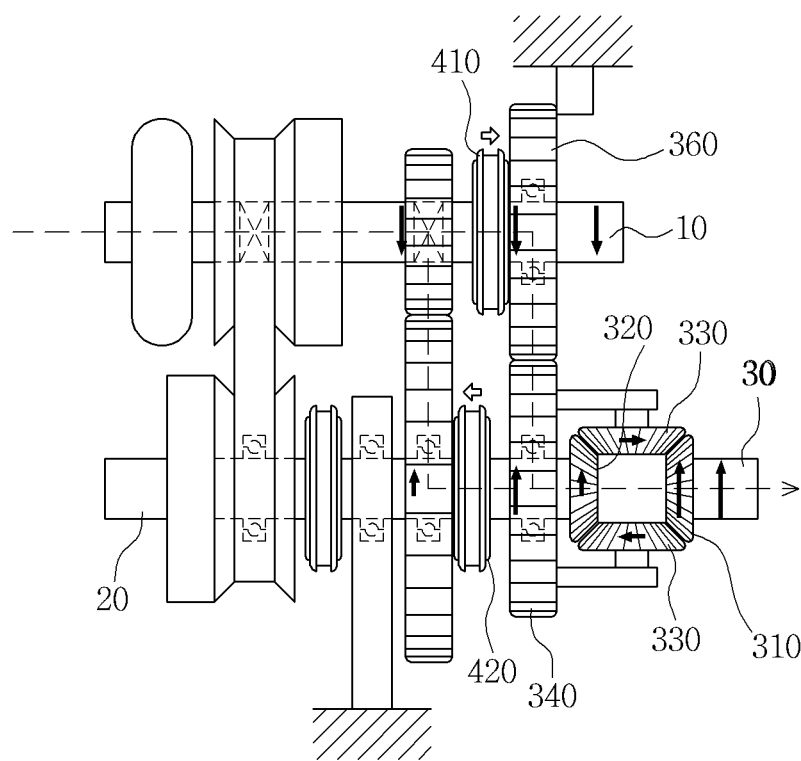

As illustrated in FIG. 2 (I), the first sleeve 410 locks the main shaft gear 360 to the main shaft 10 and the second sleeve 420 locks the ring gear 340 to the auxiliary shaft 20 in the first-stage shifting.

As a result, the ring gear 340, the auxiliary shaft 20, and the auxiliary side gear 320 rotate at the same rpm and a pair of pinion gears 330 rotates the output side gear 310 while revolving around the output side gear 310 and the auxiliary side gear 320 together with the ring gear 340 and the different gear case 350 in a non-rotation state to rotate the output shaft 30.

As illustrated in FIG. 2 (II), the first sleeve 410 locks the main shaft gear 360 to the main shaft 10 and the second sleeve 420 locks the second gear 120 to the auxiliary shaft 20 in the second-stage shifting.

As a result, the second gear 120 rotates the auxiliary shaft 20 and the auxiliary side gear 320 at a lower speed than the ring gear 340 while being rotated by the first gear 110 and a pair of pinion gears 330 accelerate the rotation of the output side gear 310 as much as the reduced rpm of the auxiliary side gear 320 while revolving together with the ring gear 340 and rotating in an arrow direction.

Figure 3:
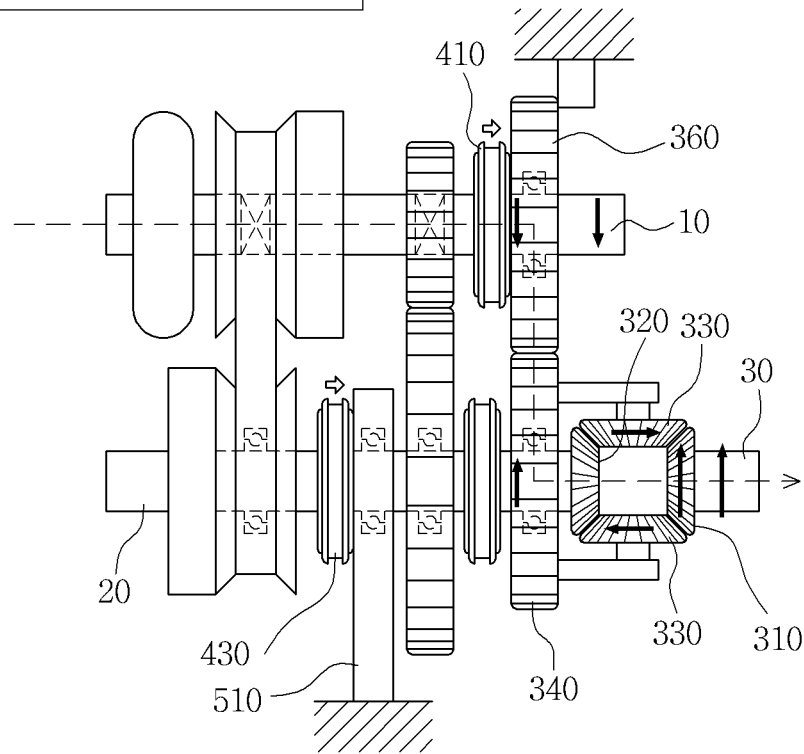
FIG. 3 is an operation state diagram illustrating third-stage shifting and fourth-stage shifting in the first exemplary embodiment according to the present invention.
Figure 3:
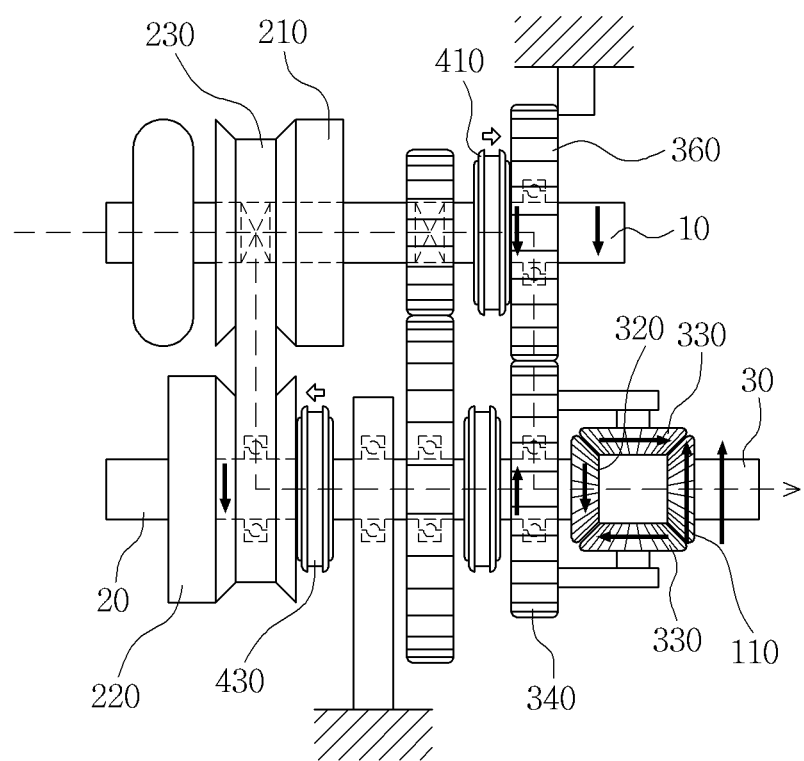

As illustrated in FIG. 3 (III), the first sleeve 410 locks the main shaft gear 360 to the main shaft 10 and the third sleeve 430 is locked to the first fixed shaft 510 to stop the rotation of the auxiliary shaft 20 in the third-stage shifting.

As a result, the auxiliary shaft 20 and the auxiliary side gear 320 stop rotating and a pair of pinion gears 330 revolve together with the ring gear 340 and rotates in the arrow direction to accelerate the rotation of the output side gear 310.

As illustrated in FIG. 3 (IV), the first sleeve 410 locks the main shaft gear 360 to the main shaft 10 and the third sleeve 430 is locked to the auxiliary sheave 220 to transmit the rotational force of the main shaft 10 to the auxiliary shaft 20 in the fourth-stage shifting or higher.

As a result, the auxiliary shaft 20 and the auxiliary side gear 320 rotate the pinion gear 330 while rotating in the opposite direction to the ring gear 340 and a pair of pinion gears 330 rotate the output side gear 310 while revolving together with the ring gear 340 and accelerate the rotation of the output side gear 310 while rotating in the arrow direction by the auxiliary side gear 320.

Figure 4:
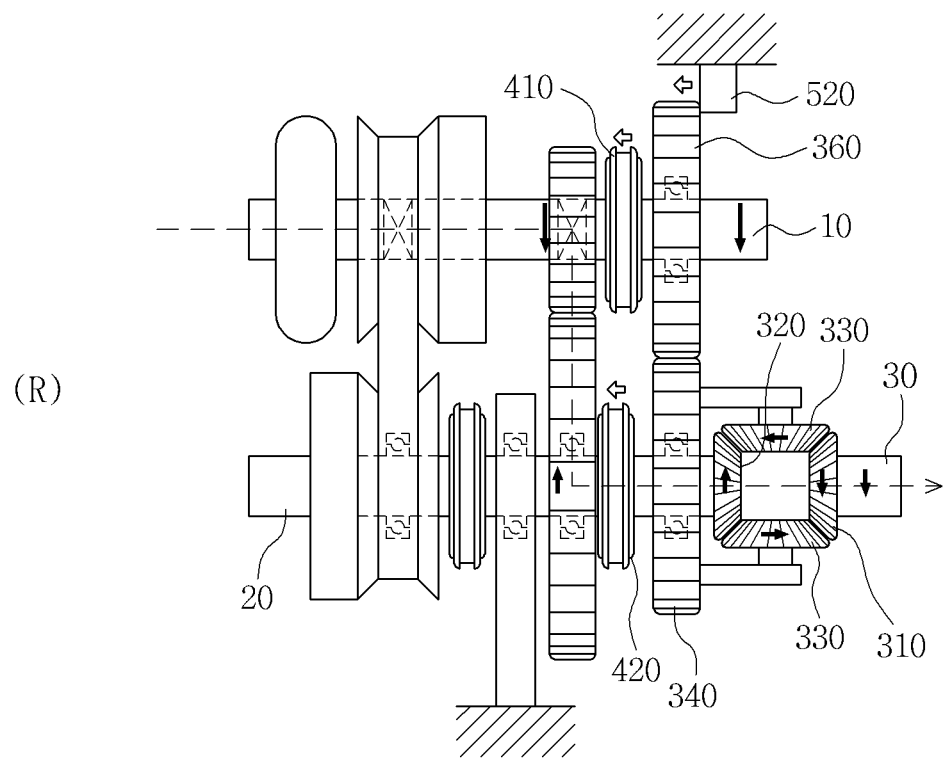
FIG. 4 is an operation state diagram illustrating reverse shifting in the first exemplary embodiment according to the present invention.

As illustrated in FIG. 4 (R), the first sleeve 410 is separated from the main shaft gear 360 to interrupt the power of the main shaft 10 transmitted to the main shaft gear 360 and the second sleeve 420 locks the second gear 120 to the auxiliary shaft 20 in the reverse shifting.

Further, the second fixed shaft 520 locks the main shaft gear 360 to stop the rotation.

As a result, the auxiliary shaft 20 and the auxiliary side gear 320 are rotated by the first gear 110 and the second gear 120 and as the main shaft gear 360 is separated from the main shaft 10 and fixed to the second fixed shaft 520, and as a result, the ring gear 340 does not rotate. In addition, while a pair of pinion gears 330 stop revolving together with the ring gear 340, a pair of pinion gears 330 rotates the output side gear 310 in the reverse direction while rotating in the arrow direction by the auxiliary side gear 320.

Here, relationships of rpm ($L_R$) of the auxiliary shaft 20 and the auxiliary side gear 320, rpm ($D_R$) of the ring gear 340, the number of rotations ($P_R$) of the pinion gear 330, and rpm ($O_R$) of the output shaft 30 and the output side gear 310 are described below.

$$2D_R = L_R + O_R, 2D_R - L_R = O_R \qquad \text{[Equation 1]}$$

$$P_R = D_R - L_R = O_R - D_R \qquad \text{[Equation 2]}$$

Accordingly, according to Equation 1, when the $L_R$ is smaller than $2D_R$, $O_R$ becomes larger and the $O_R$ becomes larger even when the $L_R$ is transmitted to the continuously variable transmission unit 200 and increases to a negative value.

Further, when the $O_R$ intends to have the negative value (reverse), the $O_R$ may have a relationship of "$2D_R < L_R$".

In other words, the rotational direction of the main shaft 10 to the auxiliary shaft 20 of the compound transmission according to the first exemplary embodiment rotates in opposite directions when the gear is a transmission medium and is transmitted in the same direction when the belt 230 is the transmission medium and by using the differential gear unit 300, both bi-directional rotational force of the auxiliary shaft 20 may be transmitted to the output shaft 30 in one direction.

As described above, the compound transmission according to the first exemplary embodiment of the present invention is capable of shifting without gear sets for only the third-stage shifting and the reverse shifting and does not operate the continuously variable transmission unit 200 in a rotation state in the third stage during shifting to the continuously variable transmission unit 200 in the third stage but increases the rpm while the rotation $L_R$ of the auxiliary shaft 20 is 0 to reduce a burden for high-speed rotation when the continuously variable transmission unit 200 is operated and to be applied from a minimum transmission rate up to a maximum transmission rate.

The compound transmission of the present invention may be widely applied to and used in not only to the transmission of the normal vehicle but also all apparatuses that perform work through the rotational force by the power of the engine, such as the excavator or the underwater pump.

In addition, a compound transmission 2 in which a differential gear and a continuously variable transmission according to a second exemplary embodiment of the present invention may be configured to include a transmission housing (see FIG. 1), a main shaft 10, an auxiliary shaft 20, an output shaft 30, a transmission gear unit 100, a continuously variable transmission unit 200, a differential gear unit 300, a sleeve unit 400', a reverse gear set 700, and a rotary sink gear set 600.

Here, the compound transmission 2 according to the second exemplary embodiment is configured to be the same as the compound transmission of the first exemplary embodiment in the transmission housing, the main shaft 10, the auxiliary shaft 20, the output shaft 30, the transmission gear unit 100, the continuously variable transmission unit 200, and the differential gear unit 300 and different from the compound transmission of the first exemplary embodiment in a sleeve unit 400', the reverse gear set 700, and the rotary sink gear set 600. Therefore, detailed description of the same components as the first exemplary embodiment will be omitted.

Figure 5:
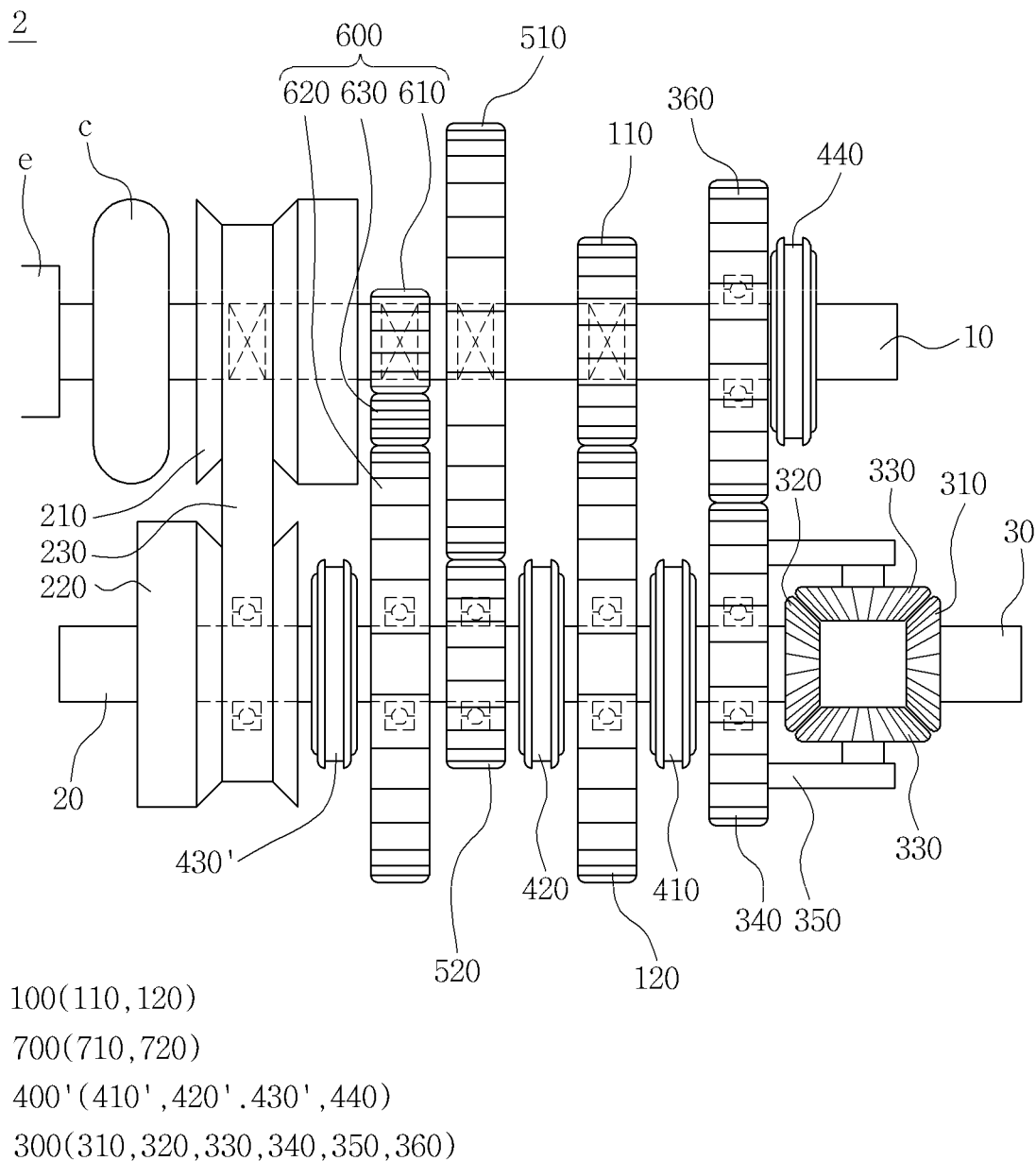
FIG. 5 is a configuration diagram illustrating a second exemplary embodiment of a compound transmission of combining a differential gear and a continuously variable transmission (CVT) according to the present invention.

The reverse gear set 700 as a component that operates only for reverse shifting may be configured to include a main reverse gear 710 and an auxiliary reverse gear 720 as illustrated in FIG. 5.

The main reverse gear 710 is fixed to the main shaft 10 as the unity and rotates together with the main shaft 10 at all times and the auxiliary reverse gear 720 is coupled to the auxiliary shaft 20 through the bearing to be idly rotatable and locked to the auxiliary shaft 20 by a second sleeve 420' described below.

Here, the auxiliary reverse gear 720 is configured to have a diameter smaller than the main reverse gear 710 to increase the rpm of the auxiliary shaft 20 and the auxiliary side gear 320.

Further, as illustrated in FIG. 5, the auxiliary reverse gear 720 is configured to have a smaller diameter than the ring gear 340 so as to increase the rpm of the auxiliary shaft 20 and the auxiliary side gear 320 compared with the rpm of the ring gear 340, and as a result, the auxiliary reverse gear 720 rotates the pinion gears 330 to rotate the output side gear 310 in the reverse direction.

The rotary sink gear set 600 is a component for equalizing the rotational direction of the main shaft 10 and the rotational direction of the auxiliary shaft 20.

The rotary sink gear unit 600 may be configured to include a main sink gear 610, an auxiliary sink gear 620, an idle gear 630 as illustrated in FIG. 5.

The main sink gear 610 is fixed to the main shaft 10 as the unity and rotates together with the main shaft 10, and the auxiliary sink gear 620 is coupled to the auxiliary shaft 20 through the bearing to be idly rotatable and locked to the auxiliary shaft 20 by a third sleeve 430' described below.

The idle gear 630 is engaged between the main sink gear 610 and the auxiliary sink gear 620 to rotate the auxiliary sink gear 620 in the same direction as the main sink gear 610.

That is, the auxiliary sink gear 620 is engaged with the main sink gear 610 through the idle gear 630 to rotate in the same direction as the main sink gear 610.

Accordingly, the auxiliary shaft 20 rotates in the same direction as the main shaft 10 when being connected to the main shaft 10 through the continuously variable transmission unit 200, and rotates in the same direction as the main shaft 10 even when being connected with the main shaft 10 through the rotary sink gear set 600.

Here, the rotary sink gear set 600 preferably switches the rotational direction of the auxiliary shaft 20 to be the same as the rotational direction by the continuously variable transmission unit 200 while operates in the third-stage shifting, which is the previous stage of the fourth-stage shifting in which the continuously variable transmission unit 200 operates.

As a result, since the auxiliary shaft 20 rotates in the same direction before the continuously variable transmission unit 200 rotates, the continuously variable transmission unit 200 may be more smoothly shifted.

The sleeve unit 400' according to the second exemplary embodiment is a component that selectively transmits the rotational force to media connected when transmitting the rotational force of the main shaft 10 to the auxiliary shaft 20, that is the above mentioned main shaft gear 360, the second gear 120, the ring gear 340, the auxiliary sheave 220, and an auxiliary reverse gear 720 described below.

As illustrated in FIG. 5, the sleeve unit 400' according to the second exemplary embodiment may be configured to include the first sleeve 410', the second sleeve 420', the third sleeve 430', and a fourth sleeve 440.

As illustrated in FIG. 5, the first sleeve 410' is installed on the shaft of the auxiliary shaft 20 and is disposed between the ring gear 340 and the second gear 120 so as to lock the ring gear 340 or the second gear 120 to the auxiliary shaft 20.

The first sleeve 410' locks the ring gear 340 to the auxiliary shaft 20 in the first-stage shifting and locks the second gear 120 to the auxiliary shaft 20 in the second-stage shifting.

As illustrated in FIG. 5, the second sleeve 420' is installed on the shaft of the auxiliary shaft 20 and is disposed between the second gear 120 and the auxiliary reverse gear 720 so as to lock the auxiliary reverse gear 720 to the auxiliary shaft 20.

The second sleeve 420' locks the auxiliary reverse gear 720 to the auxiliary shaft 20 in the reverse shifting.

As illustrated in FIG. 5, the third sleeve 430' is installed on the shaft of the auxiliary shaft 20 and is disposed between the auxiliary sink gear 620 and the auxiliary sheave 220 so as to lock the auxiliary sink gear 620 or the auxiliary sheave 220 to the auxiliary shaft 20.

The third sleeve 430' locks the auxiliary sink gear 620 to the auxiliary shaft 20 in the third-stage shifting and locks the auxiliary sheave 220 to the auxiliary shaft 20 in the high-speed shifting such as the fourth-stage shifting or higher.

The fourth sleeve 440 is provided when the main shaft gear 360 is installed in the main shaft 10 to be idly rotatable as described above, and is omitted when the main shaft gear 360 is fixed to the main shaft 10 as the unity.

The fourth sleeve 440 locks the main shaft gear 360 to the main shaft 10 in all shifting and performs a clutch function to interrupt the power between the main shaft gear 360 and the main shaft 10 before each stage is shifted.

The operation for each stage of the compound transmission 2 according to the second exemplary embodiment of the present invention including the components will be described with reference to FIGS. 6 to 8.

Figure 6:
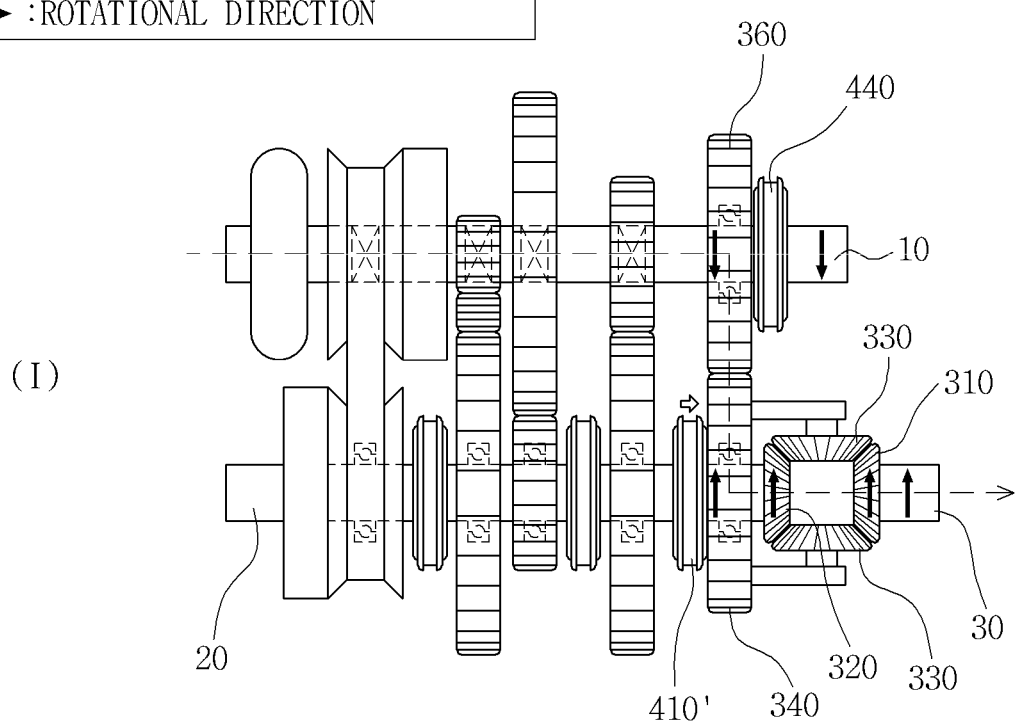
FIG. 6 is an operation state diagram illustrating first-stage shifting and second-stage shifting in the second exemplary embodiment according to the present invention.
Figure 6:
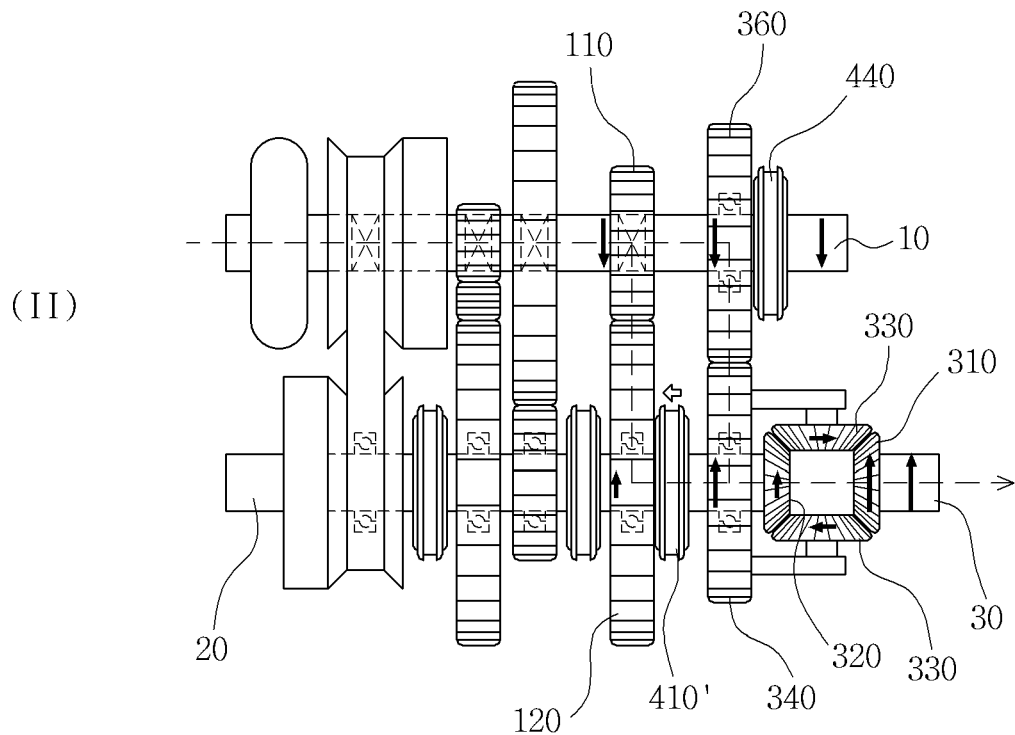

As illustrated in FIG. 6 (I), the fourth sleeve 440 locks the main shaft gear 360 to the main shaft 10 and the first sleeve 410' locks the ring gear 340 to the auxiliary shaft 20 in the first-stage shifting.

As a result, the ring gear 340, the auxiliary shaft 20, and the auxiliary side gear 320 rotate at the same rpm and a pair of pinion gears 330 rotate the output side gear 310 while revolving around the output side gear 310 and the auxiliary side gear 320 together with the ring gear 340 in a non-rotation state.

As illustrated in FIG. 6 (II), the fourth sleeve 440 locks the main shaft gear 360 to the main shaft 10 and the first sleeve 410' locks the second gear 120 to the auxiliary shaft 20 in the second-stage shifting.

As a result, the second gear 120 rotates the auxiliary shaft 20 and the auxiliary side gear 320 at a lower speed than the ring gear 340 while being rotated by the first gear 110, and a pair of pinion gears 330 accelerate the rotation of the output side gear 310 as much as the reduced rpm of the auxiliary side gear 320 while revolving together with the ring gear 340 and rotating in an arrow direction.

Figure 7:
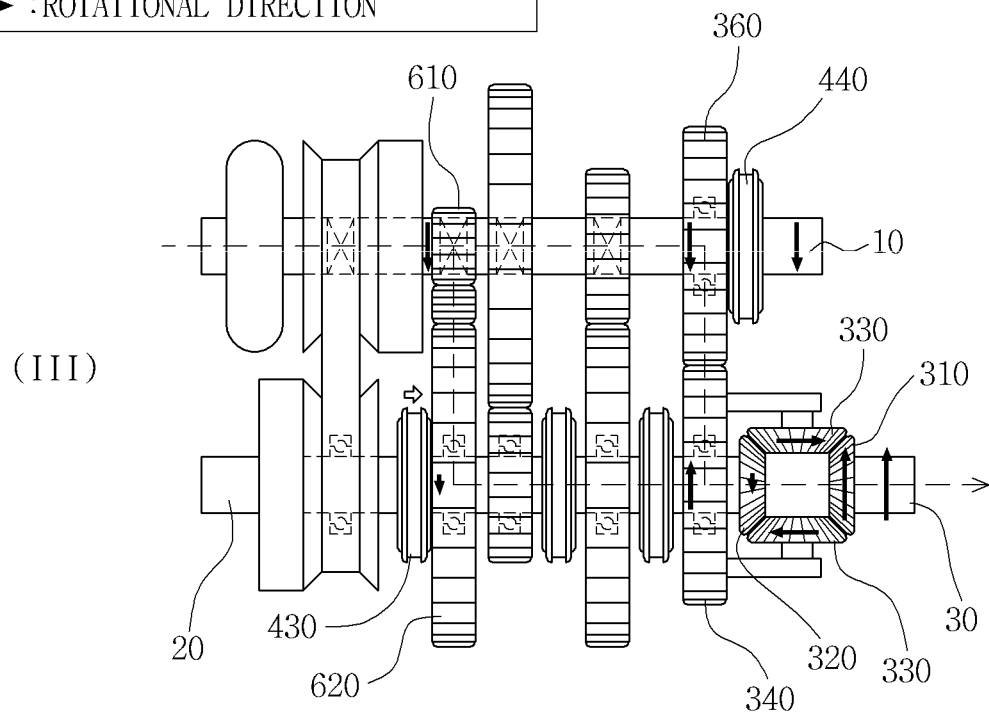
FIG. 7 is an operation state diagram illustrating third-stage shifting and fourth-stage shifting in the second exemplary embodiment according to the present invention.
Figure 7:
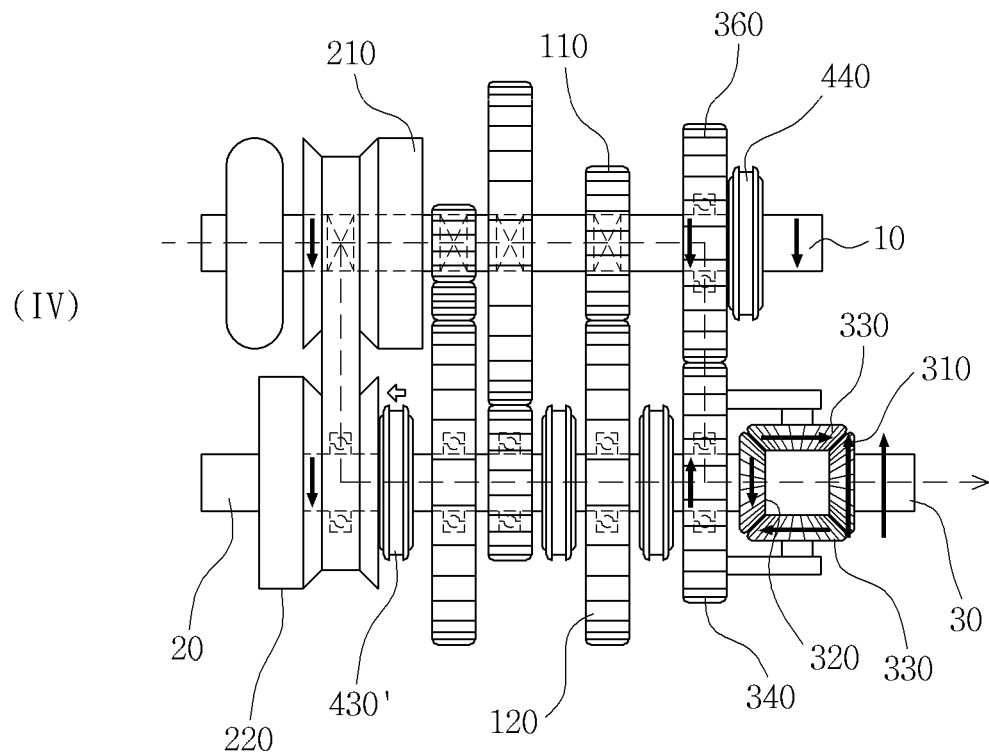

As illustrated in FIG. 7 (III), the fourth sleeve 440 locks the main shaft gear 360 to the main shaft 10, and the third sleeve 430' locks the auxiliary sink gear 620 to the auxiliary shaft 20 in the third-stage shifting.

As a result, the auxiliary sink gear 610 rotates in same direction as the main shaft 10 by the main sink gear 610 and the idle gear 630 to rotate the auxiliary shaft 20 and the auxiliary side gear 320 in the opposite direction to the rotational direction of the ring gear 340, and a pair of pinion gears 330 revolve together the ring gear 340 and rotate in the arrow direction to accelerate the rotation of the output side gear 310 as much as the opposite rpm of the auxiliary side gear 320.

As illustrated in FIG. 7 (IV), the fourth sleeve 440 locks the main shaft gear 360 to the main shaft 10, and the third sleeve 430' is locked to the auxiliary sheave 220 to transmit the rotational force of the main shaft 10 to the auxiliary shaft 20 in the fourth-stage shifting or higher.

As a result, the auxiliary shaft 20 and the auxiliary side gear 320 rotate the pinion gear 330 while rotating through the power of the continuously variable transmission unit 200, and a pair of pinion gears 330 rotate the output side gear 310 while revolving together with the ring gear 340 and accelerate the rotation of the output side gear 310 while rotating in the arrow direction by the auxiliary side gear 320.

In this case, since the auxiliary shaft 20 rotates in the same direction as the main shaft 10 in the third-stage shifting, the rotational force is smoothly transmitted when the auxiliary shaft 20 is rotated by the continuously variable transmission unit 200.

Figure 8:
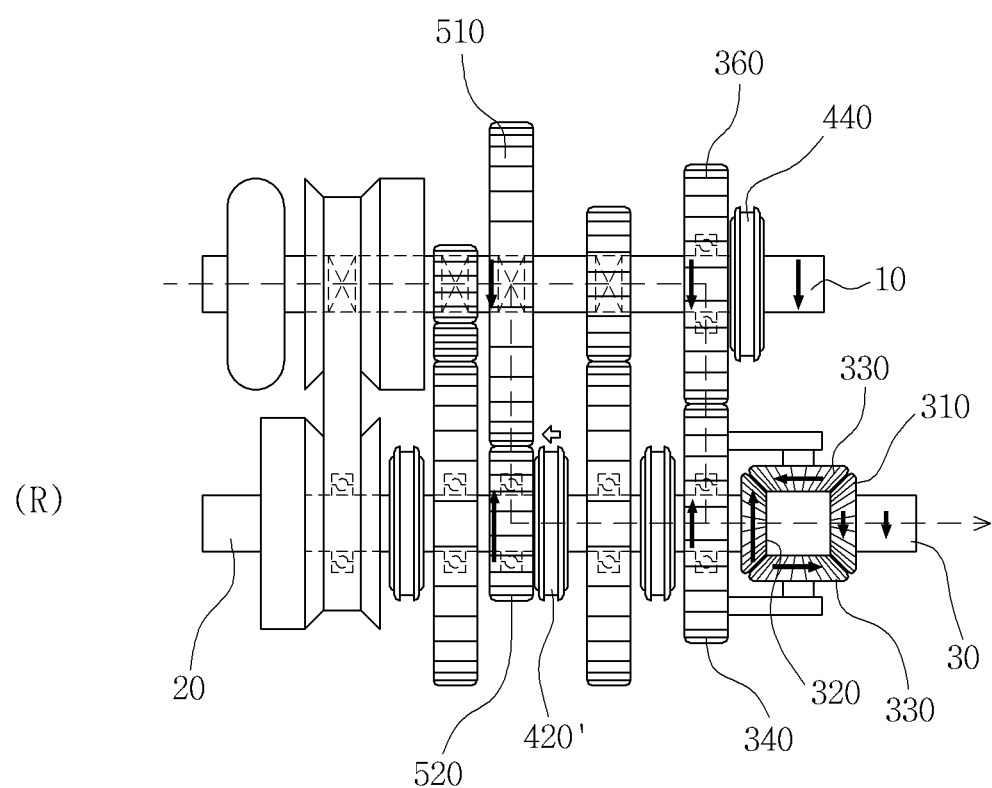
FIG. 8 is an operation state diagram illustrating reverse shifting in the second exemplary embodiment according to the present invention.

As illustrated in FIG. 8 (R), the fourth sleeve 440 locks the main shaft gear 360 to the main shaft 10 and the second sleeve 420' locks the auxiliary reverse gear 720 to the auxiliary shaft 20 in the reverse shifting.

As a result, the auxiliary shaft 20 and the auxiliary side gear 320 rotate at a speed higher than the rpm of the main shaft 10 while being rotated by the main reverse gear 710 and the auxiliary reverse gear 720, a pair of pinion gears 330 rotate in the arrow direction as the auxiliary side gear 320 rotates at a higher speed than the ring gear 340 while revolving together with the ring gear 340 to rotate the output side gear 310 in the reverse direction.

As described above, in the compound transmission according to the second exemplary embodiment of the present invention, since the auxiliary shaft 20 is rotated by the rotating sink gear set 600 in the same direction as the main shaft 10 in the three-stage shifting, more smooth shifting may be performed when shifting to the continuously variable transmission unit and since the reverse gear set 700 is separately provided, the reverse shifting may be smoothly performed.

While the present invention has been particularly illustrated and described with reference to detailed exemplary embodiments thereof, it is to be understood that the invention is not limited to the disclosed exemplary embodiments. It will be apparent to those skilled in the art that various changes, substitutions, and alterations can be made hereto without departing from the spirit of the present invention.

INDUSTRIAL APPLICABILITY

The present invention can be applied not only to the field of an automotive transmission, but also excavator field and underwater pump field requiring variation of rpm or torque of a shaft by providing optimum shift efficiency by taking advantage of a merit of each unit by performing shifting through a transmission gear unit, a continuously variable transmission unit, and a differential gear unit.

DRAWINGS

FIG. 2
POWER TRANSMISSION DIRECTION
ROTATIONAL DIRECTION
FIG. 3
POWER TRANSMISSION DIRECTION
ROTATIONAL DIRECTION
FIG. 4
POWER TRANSMISSION DIRECTION
ROTATIONAL DIRECTION
FIG. 6
POWER TRANSMISSION DIRECTION
ROTATIONAL DIRECTION
FIG. 7
POWER TRANSMISSION DIRECTION
ROTATIONAL DIRECTION
FIG. 8
POWER TRANSMISSION DIRECTION
ROTATIONAL DIRECTION

The invention claimed is:

1. A compound transmission of combining a differential gear and a continuously variable transmission, which transmits power generated by an engine and shifts the power to rotational force required depending on a speed, the compound transmission comprising:
   a transmission housing;
   a main shaft connected to the engine while being embedded in the transmission housing and rotated by the power;
   an auxiliary shaft separated from the main shaft while being embedded in the transmission housing;
   an output shaft directly connected to the main shaft or connected to the main shaft via the auxiliary shaft and drawn from the transmission housing and outputting the rotational force;
   a transmission gear unit connecting the main shaft and the auxiliary shaft in a gear mode and connecting the main shaft and the auxiliary shaft in a set gear ratio and varying a rotational speed of the output shaft;
   a continuously variable transmission unit connecting the main shaft and the auxiliary shaft in a continuously variable transmission mode and varying the rotational speed of the output shaft;

a differential gear unit connecting the main shaft and the auxiliary shaft with the output shaft in a differential gear mode and varying the rotational speed of the output shaft depending on the rotational speed of the auxiliary shaft while being rotated by the main shaft;

a sleeve unit transmitting the rotational force of the main shaft to the differential gear unit through the transmission gear unit or transmitting the rotational force of the main shaft to the differential gear unit through the continuously variable transmission unit; and a fixed shaft unit restraining rotation of the auxiliary shaft through the sleeve unit to rotate the differential gear unit only through the rotational force of the main shaft or restraining rotation of a part of the differential gear unit to switch a rotational direction of the output shaft.

2. The compound transmission of combining the differential gear and the continuously variable transmission of claim 1, wherein the differential gear unit includes an output side gear fixed to the output shaft as a unity, rotating together with the output shaft, and configured by a conical bevel gear, an auxiliary side gear fixed to the auxiliary shaft as the unity and rotating together with the auxiliary shaft through the transmission gear unit or the continuously variable transmission unit and facing the output side gear in a symmetrical state, a pair of pinion gears rotating the output side gear while revolving around the output side gear and the auxiliary side gear in engagement with the output side gear and the auxiliary side gear and varying rpm (revolutions per minute) of the output side gear while rotating by rotation of the auxiliary side gear by the rotation by the auxiliary shaft, a ring gear coupled to the auxiliary shaft to be idly rotatable while forming the same axis as the auxiliary shaft and rotated by the main shaft or locked to the auxiliary shaft by the sleeve unit and rotating together with the auxiliary shaft and connected with the pinion gears and revolving the pinion gears around the output side gear and the auxiliary side gear, a differential gear case fixed to the ring gear as the unity while being coupled to each of the pinion gears to be idly rotatable and rotating together with the ring gear, and a main shaft gear engaged with the ring gear while being coupled to the main shaft to be idly rotatable and locked to the main shaft by the sleeve unit to transmit the rotational force of the main shaft to the ring gear.

3. The compound transmission of combining the differential gear and the continuously variable transmission of claim 2, wherein the transmission gear unit includes a first gear fixed to the main shaft as the unity and rotating together with the main shaft, and a second gear engaged with the first gear while being coupled to the auxiliary shaft to be idly rotatable to idly rotate by the first gear or locked to the auxiliary shaft by the sleeve unit to rotate together with the auxiliary shaft and configured in a gear ratio to decrease rpm (revolutions per minute) of the first gear to decrease the rpm (revolutions per minute) of the auxiliary shaft and increase the rpm (revolutions per minute) of the output side gear.

4. The compound transmission of combining the differential gear and the continuously variable transmission of claim 3, wherein the second gear is formed to have a larger diameter than the ring gear.

5. The compound transmission of combining the differential gear and the continuously variable transmission of claim 2, wherein the sleeve unit includes a first sleeve installed in the main shaft and disposed adjacent to the main shaft gear and locking the main shaft gear to the main shaft, a second sleeve installed in the auxiliary shaft and disposed between the ring gear and the transmission gear unit and locking the ring gear to the auxiliary shaft or locking the transmission gear unit to the auxiliary shaft, and a third sleeve installed in the auxiliary shaft and disposed adjacent to the continuously variable transmission unit and transmitting the rotational force through the continuously variable transmission unit to the auxiliary shaft.

6. The compound transmission of combining the differential gear and the continuously variable transmission of claim 2, wherein the fixed shaft unit includes a first fixed shaft penetrated by the auxiliary shaft and fixed to the transmission housing and allowing rotation of the auxiliary shaft and locked to the auxiliary shaft by operating the sleeve unit and stopping the rotation of the auxiliary shaft, and a second fixed shaft adjacent to the main shaft gear and fixed to the transmission housing, locked to the main shaft gear in a close contact state and stopping the rotation of the main shaft gear and stopping the rotation ring gear.

7. The compound transmission of combining the differential gear and the continuously variable transmission of claim 1, wherein the continuously variable transmission unit includes a main sheave fixed to the main shaft as the unity and rotating together with the main shaft, and having an outer diameter which is varied, and an auxiliary sheave connected to the main sheave by a belt while being coupled to the auxiliary shaft to be idly rotatable and idly rotated by the rotation of the main sheave or locked to the auxiliary shaft by the sleeve unit and rotating the auxiliary shaft.

* * * * *